(No Model.)

W. & A. McLAUCHLAN.
IRON BUCKET.

No. 470,947. Patented Mar. 15, 1892.

Witnesses:
Walter Allen
B. W. Sommers.

Inventors.
Wm. McLauchlan, & Ann McLauchlan,
by Herbert W. T. Jenner.
Attorney.

UNITED STATES PATENT OFFICE.

WILLIAM McLAUCHLAN AND ANN McLAUCHLAN, OF MANCHESTER, ENGLAND.

IRON BUCKET.

SPECIFICATION forming part of Letters Patent No. 470,947, dated March 15, 1892.

Application filed June 20, 1891. Serial No. 396,951. (No model.) Patented in England March 26, 1890, No. 4,729.

*To all whom it may concern:*

Be it known that we, WILLIAM McLAUCHLAN and ANN McLAUCHLAN, subjects of the Queen of Great Britain and Ireland, residing at Manchester, in the county of Lancaster, England, have invented new and useful Improvements in Iron Buckets, Coal-Buckets, Slop-Pails, Bowls, and Basins, (for which we have obtained a patent in Great Britain, No. 4,729, bearing date March 26, 1890,) of which the following is a specification.

These improvements are to do away with the noise of these articles when in use; and they consist of india-rubber feet attached on the bottom and india-rubber washers applied to the eyelets or ears of the handles and of india-rubber guards applied to the handles, thereby making the above articles or utensils perfectly noiseless when in use.

Figure 1:
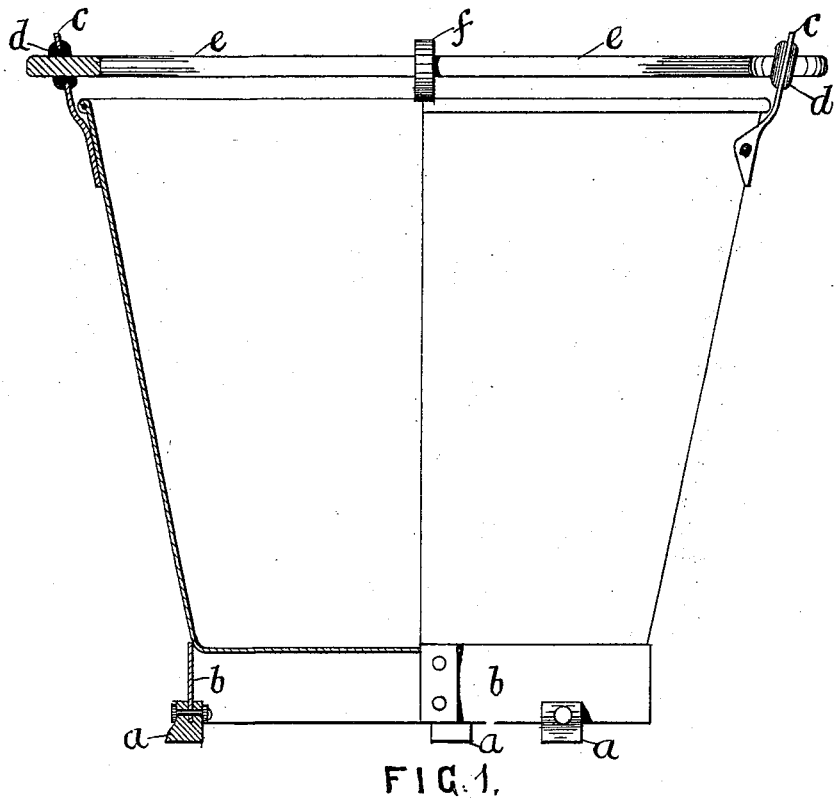
Figure 2:
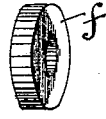
Figure 3:
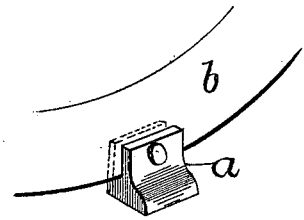

On the accompanying drawings, Figure 1 represents a side view, half in section, of an ordinary house-bucket having our improvements applied; and Figs. 2 to 6 are details of the parts shown separately. Fig. 3 is a perspective view of our improved rubber noiseless foot or pad *a*, three or more of which feet *a* are secured to the bottom rim *b* of the bucket by a rivet passed through the rim and through the india-rubber on each side of the rim, as illustrated; or the said rubber feet *a* may be eyeleted or otherwise fastened to the said rim.

We have shown in Fig. 3 our improved rubber foot-pad molded with a slot to embrace the rim *b;* but it will be apparent that a simple form of pad would be a narrow strip of rubber or other suitable material bent round the edge of the rim and riveted, eyeleted, or otherwise fastened thereto. To the ears *c* of the bucket we also apply india-rubber washers or rings *d*, (seen on an enlarged scale in perspective view, Fig. 4, and front view, Fig. 5, and in transverse section in Fig. 6,) and through these rings *d* so applied (and which practically form rubber eyelets) to the ears *c* we pass the loops or extremities of the handle *e*, and thus effectually deaden the sound of the handle in turning and in handling the bucket, while by the application of a rubber guard or ring *f* (see separate perspective view, Fig. 2) we similarly deaden the sound of the said handle *e* in its falling or coming in contact with the top rim of the bucket.

Figure 7:
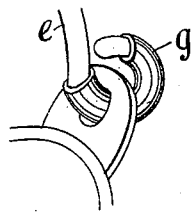
Figure 4:
Figure 5:
Figure 6:
Figure 8:
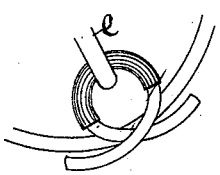

Figs. 7 and 8 illustrate our improvements as applied to other forms of ears, a piece of india-rubber tubing *g* in the one case (see Fig. 7) being drawn over the hook portion of the handle *e* and in the other over the ear itself. (See Fig. 8.) In this manner we render a bucket, whether constructed of wood, metal, or other material, perfectly noiseless in use, as aforesaid.

What we claim, and desire to secure by Letters Patent, is—

1. The combination, with a vessel, such as a bucket, provided with a pivoted handle, of india-rubber feet secured to the bottom of the vessel, an india-rubber ring encircling the handle and adapted to come in contact with the vessel, and bushes of india-rubber interposed between the pivoted end portions of the handle and the vessel, substantially as and for the purpose set forth.

2. The combination, with a vessel, such as a bucket provided with a pivoted handle, of an india-rubber ring encircling the handle and adapted to come in contact with the vessel, and bushes of india-rubber interposed between the pivoted end portions of the handle and the vessel, substantially as and for the purpose set forth.

In testimony whereof we have hereunto set our hands in the presence of two subscribing witnesses.

WILLIAM McLAUCHLAN.
ANN McLAUCHLAN.

Witnesses:
WALTER GUNN,
EDMUND WILSON.